Aug. 6, 1957   G. WALTERS ET AL   2,801,456
WOVEN LADDER TAPE AND METHOD OF AND APPARATUS
FOR MAKING THE SAME
Filed Sept. 7, 1954   8 Sheets-Sheet 1
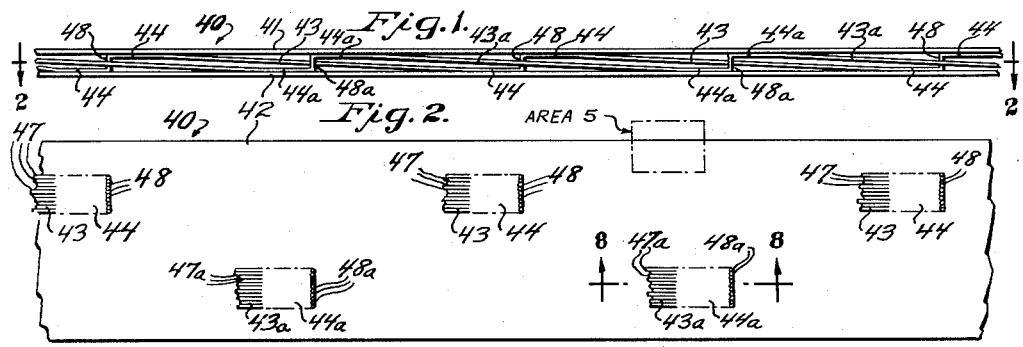
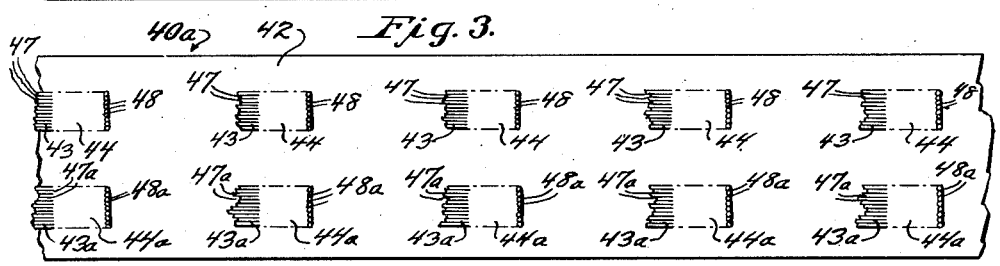
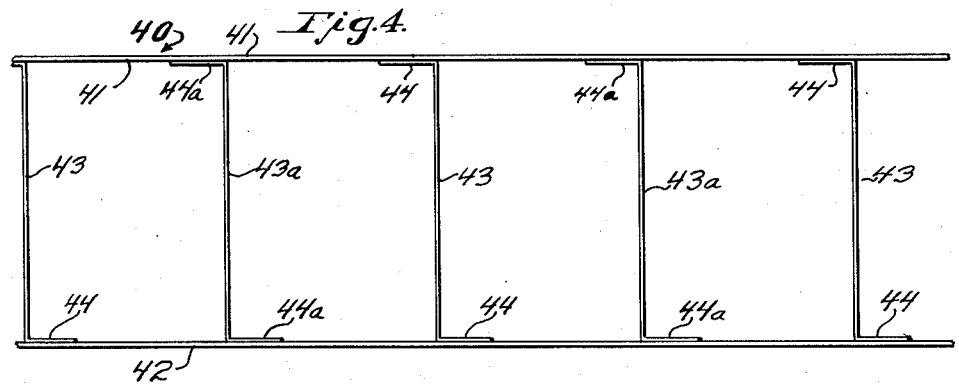
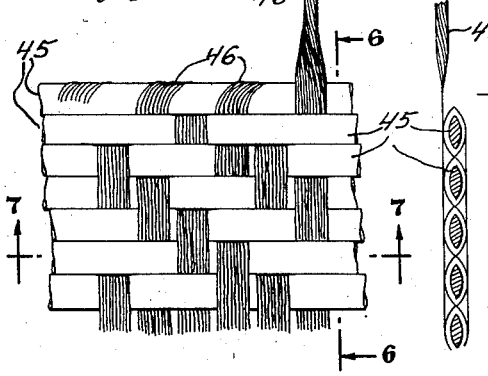
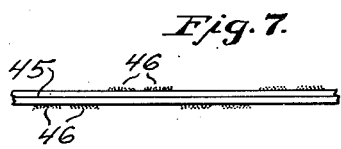
Inventors
Gustav Walters
Lawrence J. Rasero
David B. Brownlow
By Frank H. Schwartz
Attorney

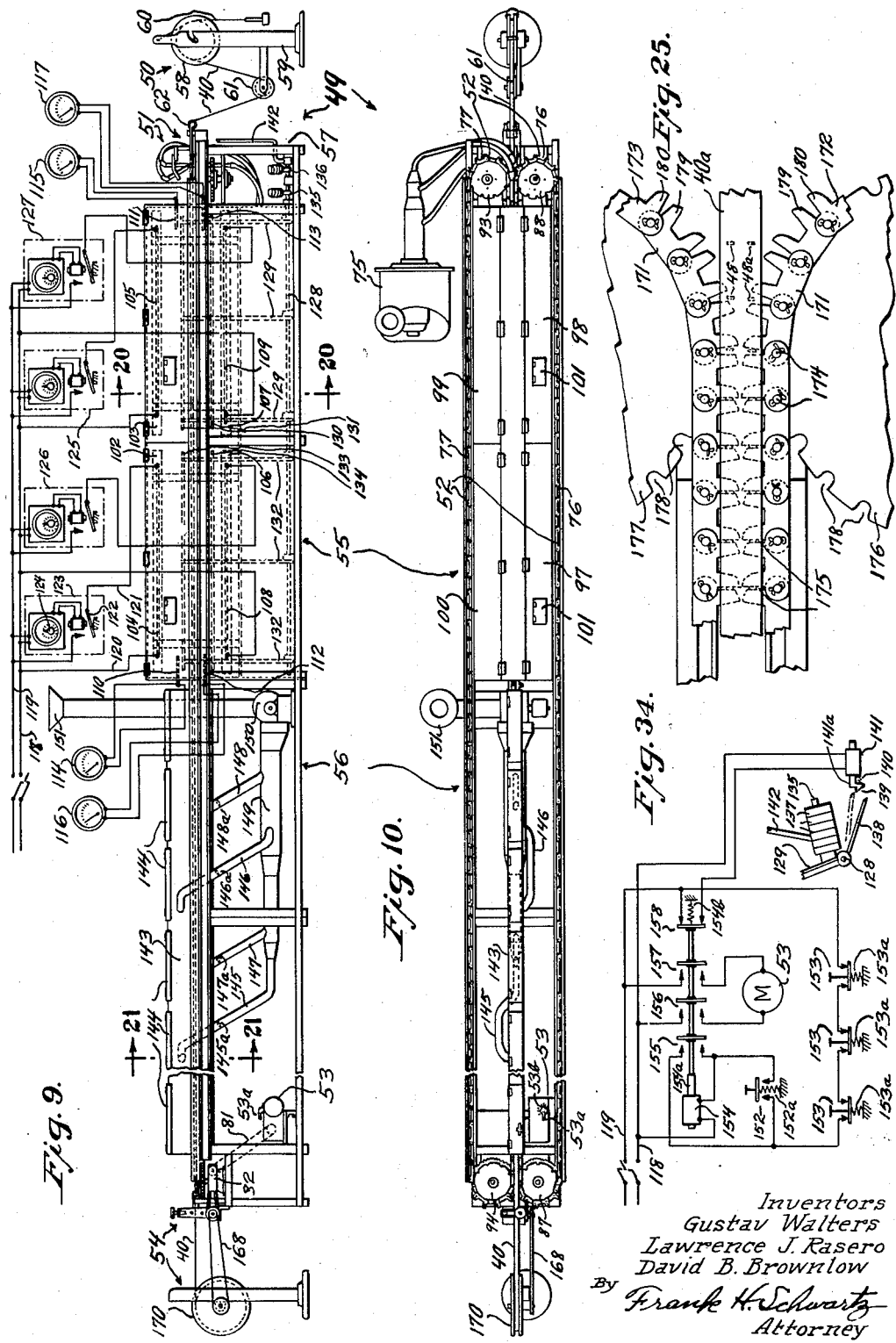

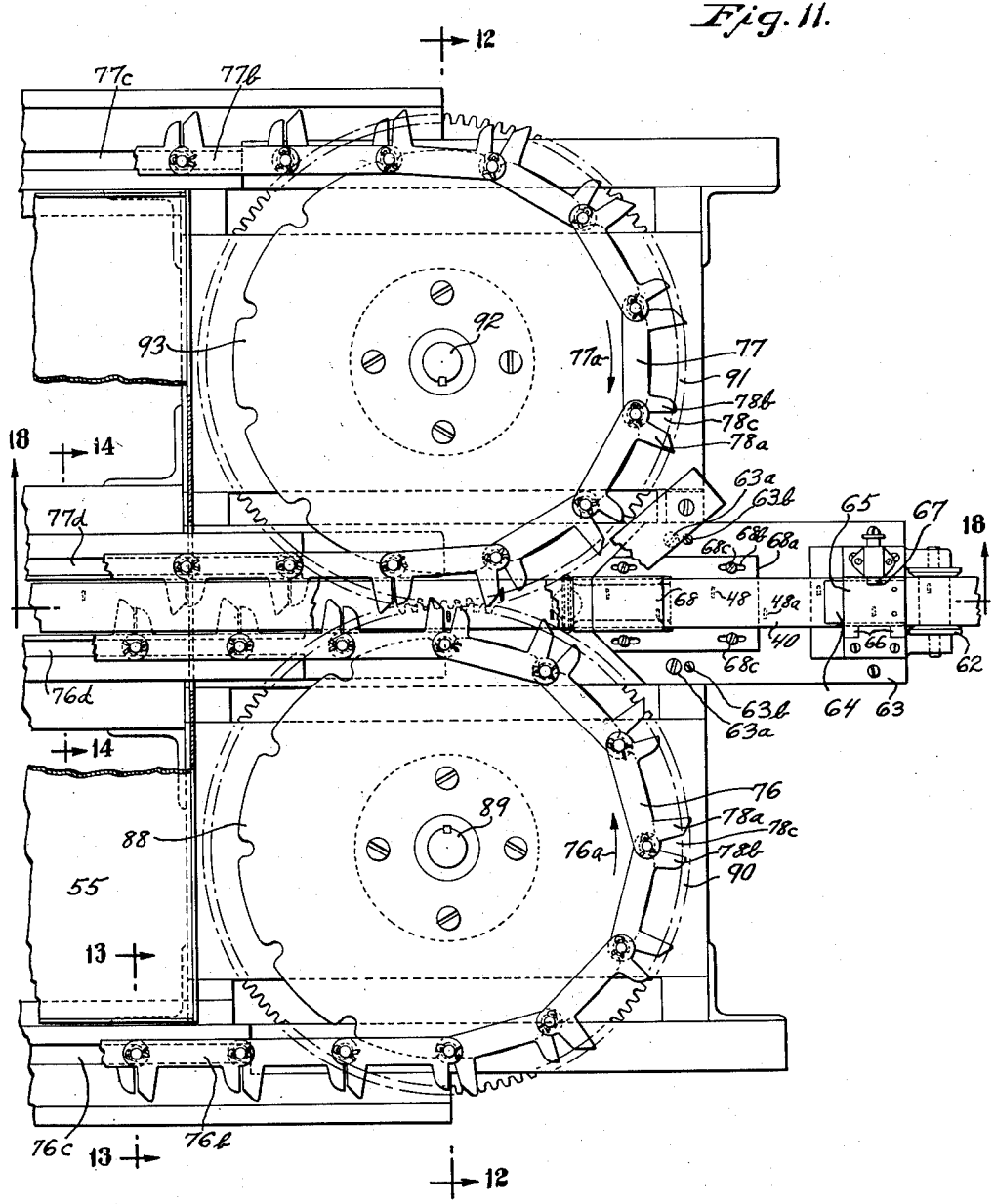

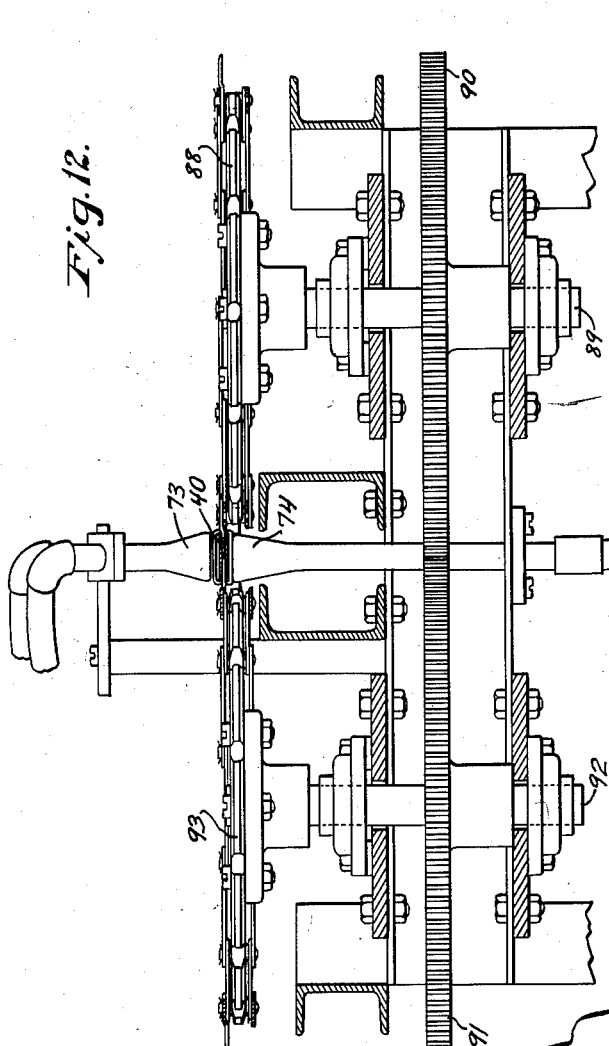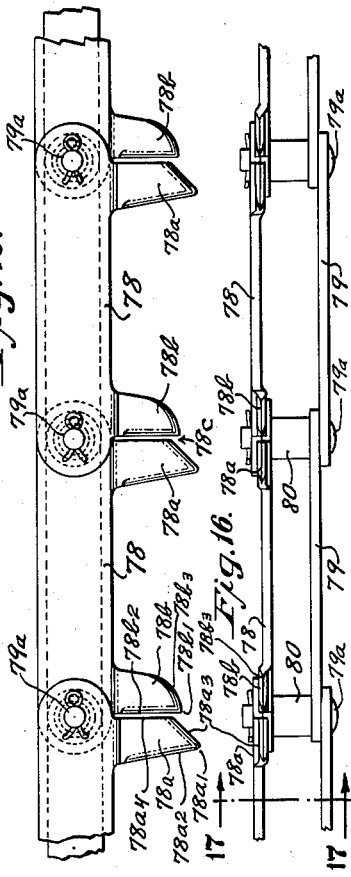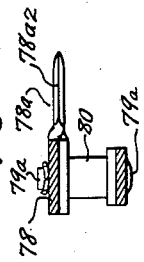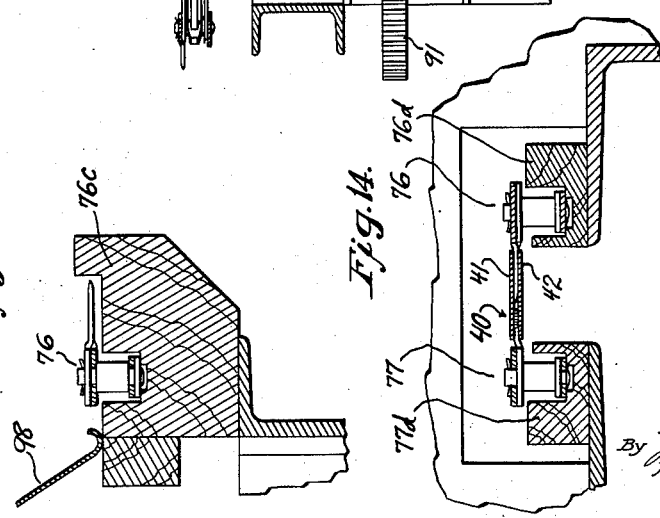

Aug. 6, 1957     G. WALTERS ET AL     2,801,456
WOVEN LADDER TAPE AND METHOD OF AND APPARATUS
FOR MAKING THE SAME
Filed Sept. 7, 1954     8 Sheets-Sheet 5
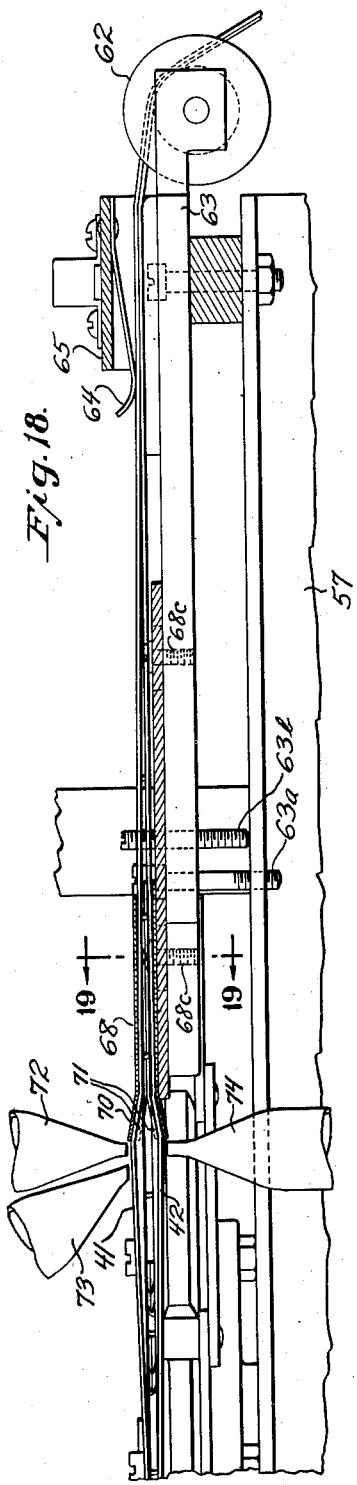
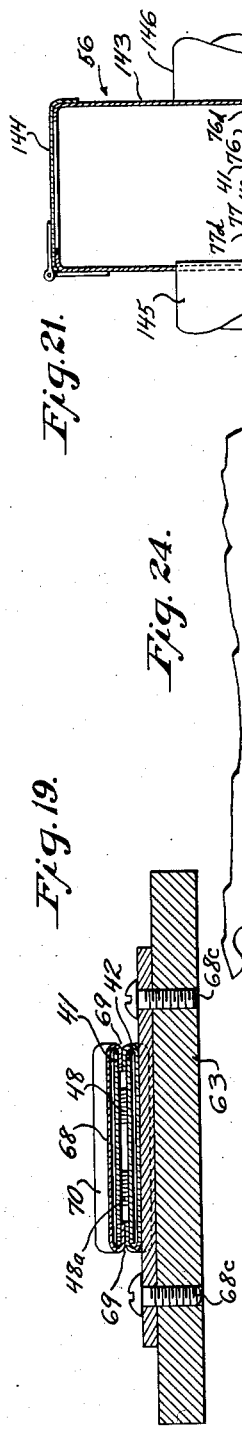
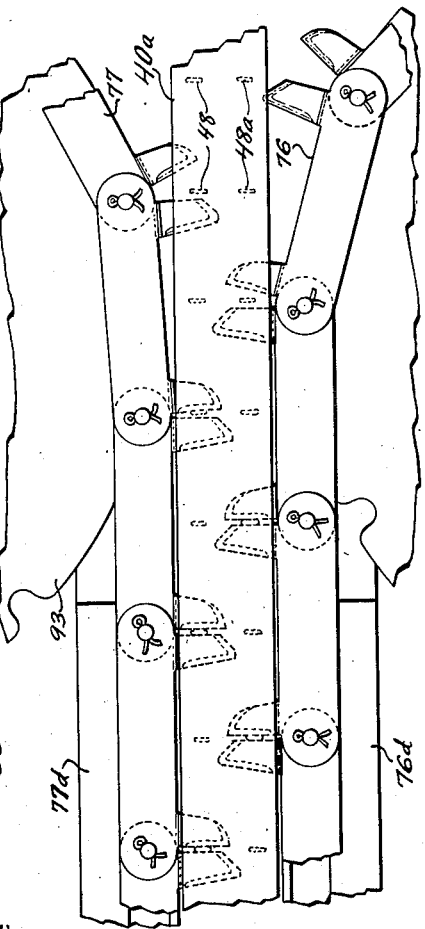
Inventors
Gustav Walters
Lawrence J. Rasero
David B. Brownlow
By Frank H. Schwartz
Attorney Inventors
Gustav Walters
Lawrence J. Rasero
David B. Brownlow
By Frank H. Schwartz
Attorney Inventors
Gustav Walters
Lawrence J. Rasero
David B. Brownlow
By Frank H. Schwartz
Attorney

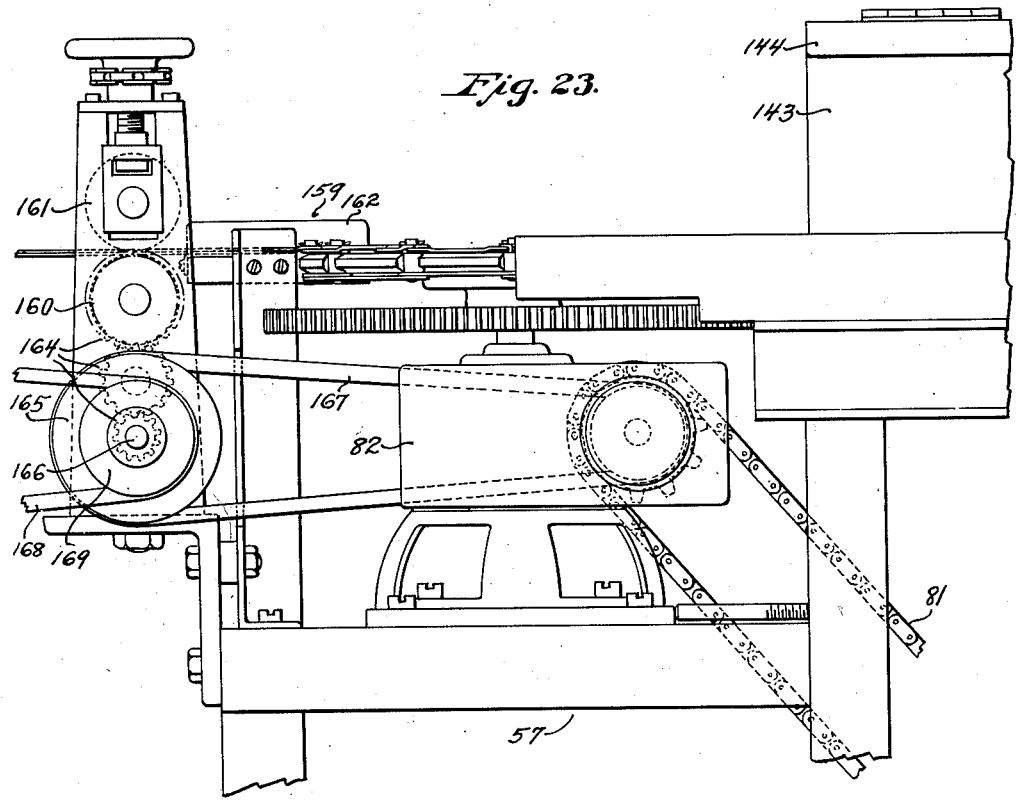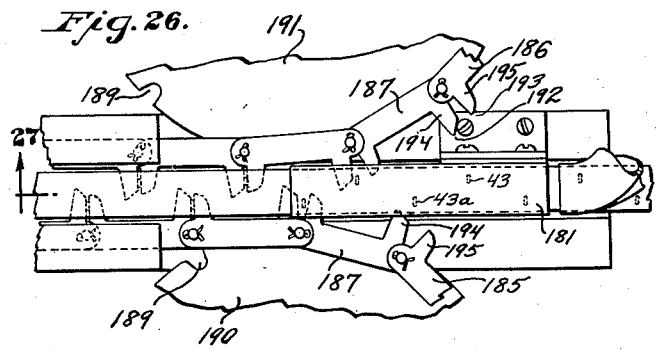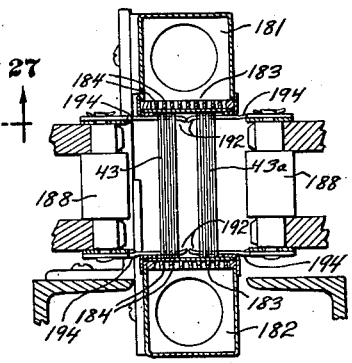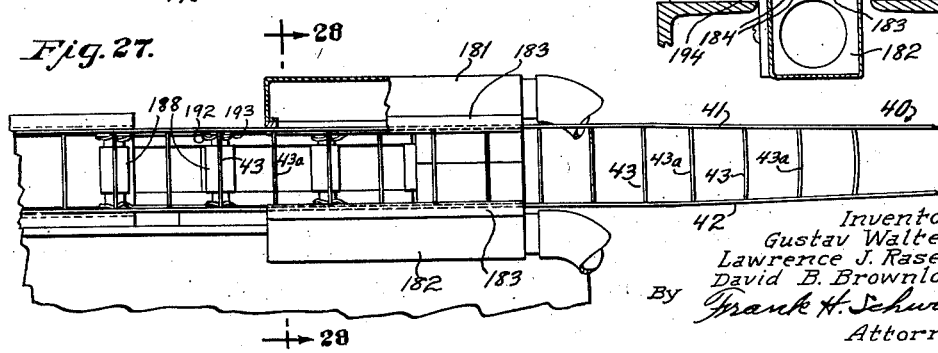

United States Patent Office 2,801,456
Patented Aug. 6, 1957

2,801,456

WOVEN LADDER TAPE AND METHOD OF AND APPARATUS FOR MAKING THE SAME

Gustav Walters, Lawrence J. Rasero, and David B. Brownlow, Middletown, Conn.; said Rasero and said Brownlow assignors to The Russell Manufacturing Company, Middletown, Conn., a corporation of Connecticut Application September 7, 1954, Serial No. 454,539

11 Claims. (Cl. 28—72)

This invention relates to improvements in woven ladder tape or webbing also known as Venetian-blind tape, and to methods of and apparatus for making such tape. Such tape comprises a pair of front or face, and back or rear main tapes between which extend the rungs or ladders which interconnect the two main tapes, and which rungs or ladders also support the slats of the Venetian-blind in which the ladder tape is used.

In the making of woven ladder tape, it has not been possible to weave it with all the ladders or rungs substantially uniformly spaced apart a predetermined distance, due to a number of variable factors which have prevented doing so. Such uncontrolled irregularity of spacing has frequently been so great as to result in light showing through between the slats when the blind is closed, a defect that is so serious as to be commercially unacceptable.

One object of this invention is to make woven ladder tape in which the ladders are substantially uniformly spaced apart.

Another object of this invention is to provide a method and apparatus for making multiple-length woven ladder tape in which the ladders are substantially uniformly spaced apart.

With the above and other objects in view as will appear from the present disclosure to those skilled in the art, this invention includes all features of this disclosure which are novel over the prior art.

In the description and claims, the various parts and steps are identified by specific terms for convenience, but they are intended to be as generic in their application as the prior art will permit.

In the accompanying drawings forming part of the present disclosure, in which certain ways of carrying out the invention are shown for illustrative purposes:

Fig. 1 is a full-scale side-edge view of a fragment of staggered-rung or ladder, ladder tape made in accordance with the present invention, before the cross-over floats have been cut to permit the ladder tape to be opened out for use;

Fig. 2 is a sectional view on line 2—2 of Fig. 1;

Fig. 3 is a sectional view similar to Fig. 2, of a fragment of twin-rung ladder tape;

Fig. 4 is a view similar to Fig. 1 but with the ladder tape opened out after the cross-over floats have been cut;

Fig. 5 is an enlarged view of the area 5 of the main tape shown in Fig. 2;

Fig. 6 is a schematic sectional view on line 6—6 of Fig. 5;

Fig. 7 is a sectional view on line 7—7 of Fig. 5;

Fig. 8 is an enlarged schematic sectional view on line 8—8 of Fig. 2, through a weave-in area of the lower or back main tape thereof;

Fig. 9 is a side elevation, with some parts shown schematically, of a form of apparatus forming part of the present invention;

Fig. 10 is a top plan view of Fig. 9 with the schematic showing omitted;

Fig. 11 is an enlarged top plan view of part of the right-end portion of Fig. 10;

Fig. 12 is a sectional view on line 12—12 of Fig. 11;

Fig. 13 is an enlarged fragmental sectional view on line 13—13 of Fig. 11;

Fig. 14 is an enlarged fragmental sectional view on line 14—14 of Fig. 11;

Fig. 15 is a top plan view of a fragment of one form of setting chain illustrated in the drawings;

Fig. 16 is a front elevation of Fig. 15;

Fig. 17 is a sectional view on line 17—17 of Fig. 16;

Fig. 18 is an enlarged sectional view on line 18—18 of Fig. 11;

Fig. 19 is a sectional view on line 19—19 of Fig. 18;

Fig. 21 is an enlarged sectional view on line 21—21 of Fig. 9;

Fig. 23 (sheet 8) is a front elevation of Fig. 22;

Fig. 24 (sheet 5) is an enlarged plan view of a fragment of Fig. 11, illustrating the setting of a piece of twin-rung ladder tape instead of the staggered-run ladder tape shown in Fig. 11;

Fig. 25 (sheet 2) is a reduced-scale fragmental view similar to Fig. 24, of a modified form of chain-setting construction, with a fragment of twin-rung ladder tape shown therewith;

Fig. 26 (sheet 8) is a fragmental view similar to Fig. 11, on another modified construction employing a modified form of vacuum spreading and holding means;

Fig. 27 is a sectional view on line 27—27 of Fig. 26;

Fig. 28 is a sectional view on line 28—28 of Fig. 27;

Fig. 34 (sheet 2) is a schematic wiring diagram for operating mechanism of the machine illustrated in Figs. 9 and 10.

Figure 20:
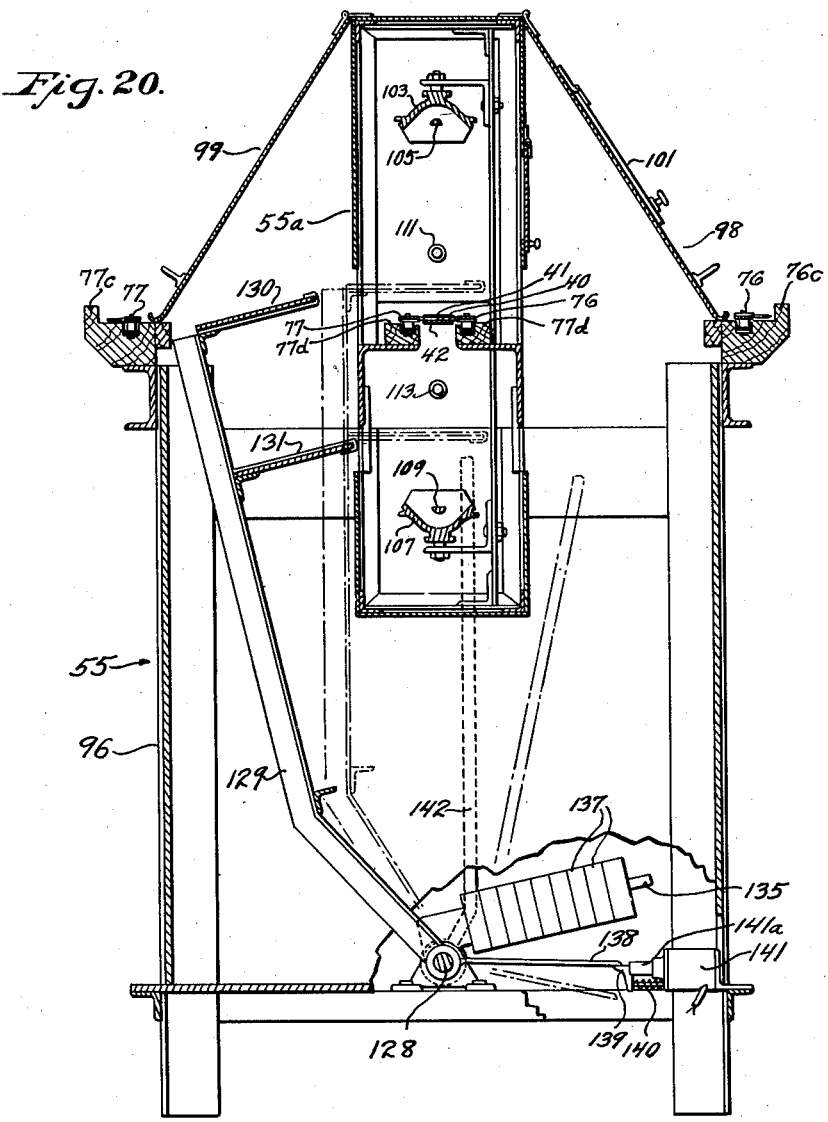
Fig. 20 (sheet 6) is an enlarged sectional view on line 20—20 of Fig. 9.

Referring to Figs. 1, 2 and 4 to 8 of the drawings, the woven, staggered-rung or ladder, ladder tape 40, includes a front or face main tape 41, and a back or rear main tape 42, with the two main tapes interconnected by two rows of rungs or ladders 43, 43a which are connected to the main tapes by weaving at weave-ins or weave-in areas 44, 44a, in a way well understood by those skilled in the art.

Each of the main tapes 41 and 42 is formed by having main-tape warp strands 45 (Figs. 5 to 7) extending throughout the length of the main tapes and interwoven with the weft picks of a main-tape weft strand or strands 46. Each main-tape warp strand preferably is a plastic strand, preferably a monofilament plastic strand, and preferably of saran plastic which chemically is composed of copolymers of vinylidene chloride and vinyl chloride. Each warp strand also preferably is of considerably less maximum thickness than width, that is, of considerably greater width than maximum thickness.

Each main weft strand preferably is a continuous-multi-filament strand, preferably of nylon, and preferably of less twist than seven turns per inch, so that it flattens out where it crosses over and between the warp strands Each ladder or rung 43 of one row of ladders, has a group or plurality of ladder-warps or ladder-warp strands 47 which are woven into one main tape, as for example 42 (at the left end of Fig. 1), to form a weave-in or weave-in area 44, which ladder-warps 47 then extend across to the other main tape 41 as cross-over floats or a group of floats 48, and then are woven into the other main tape 41 as another weave-in 44, and which ladder-warps 47 then extend as a ladder or rung 43 back to the main tape 42 where they are woven into the main tape 42 as another weave-in 44, and so on throughout the length of the tape. And similarly, the other row of ladders 43a has a group or plurality of ladder-warps or ladder-warp strands 47a which are woven into the main tape 42 to form a weave-in area 44a, which ladder warps 47a then extend across to the other main tape 41 as cross-over floats 48a, and then are woven into the other main tape 41 as another weave-in 44a, and which ladder warps 47a then extend as a ladder or rung 43a back to the main tape 42 where they are woven into the main tape 42 as another weave-in 44a, and so on.

The main difference so far as this invention is concerned, between the staggered-rung ladder tape 40 of Figs. 1 and 2, and the twin-rung ladder tape 40a of Fig. 3, is that the twin rung ladder tape 40a of Fig. 3 has twice as many rungs or ladders 43, 43a, weave-ins 44, 44a and cross-over floats 48, 48a per unit of length, as the staggered-rung ladder tape of Figs. 1 and 2 has, as is well known to those skilled in the art.

The form of the ladders shown in this application, is the well-known string-ladder which consists of a plurality of ladder-warp strands such as 47 in side-by-side relation (Figs. 2 and 3). Another well-known form of ladder is the woven ladder, which has ladder weft strands woven with the ladder-warps, but this is not shown in this application as the string ladder is simpler and is adequate to illustrate the present invention.

As hereinbefore stated, it has not been found possible to weave ladder tape with the longitudinal distance between all the ladders substantially uniformly spaced apart, that is, with the longitudinal spacing between each two successive places of connection of the ladders with each main tape, a predetermined, substantially constant distance. This is true in a high degree where each main-tape warp strand is a monofilament plastic strand, and particularly where such strands are of saran plastic.

For convenience and simplicity, a weave-in or weave-in area will be understood to include the cross-over floats and ladders connected to such weave-in. Expressions such as longitudinal distance between two successive ladders, means the distance parallel to a side edge of a main tape of the ladder tape, between the two parallel lines at right angles to the said side edge of the tape and respectively passing through the centers of the ladder warp strands of two groups of ladder-warp strands where they extend out from their connections at the weave-ins. In other words, the longitudinal distance between two successive but staggered ladders in Fig. 2 is the same as the longitudinal distance between two successive longitudinally-aligned ladders of Fig. 3. The longitudinal distance between two successive ladders, whether the ladder tape be staggered tape or twin-rung tape, has the same function as concerns the width of a Venetian-blind slat which extends crosswise between such successive ladders.

The invention contemplates the making of multiple-length ladder tape that has a predetermined, substantially uniform longitudinal distance or spacing between successive ladders, by weaving or otherwise obtaining woven initial-stage ladder tape having a predetermined and controlled irregularity of distance between longitudinally-aligned successive ladders, and then subjecting such initial-stage ladder tape to controlled shrinking or setting, whereby the longitudinal distance between successive ladders becomes a predetermined substantially constant distance to make the desired ladder tape which may also be referred to as final-stage ladder tape, for clearness in the claims.

In a preferred way of accomplishing the foregoing described result, initial-stage ladder tape is woven with each of the two main tapes substantially shrinkable by having each main-tape warp strand, a monofilament saran plastic strand, which is readily shrinkable by heat treatment, and preferably is of the oppositely-convex cross-sectional form illustrated in Fig. 6, and preferably less than .010" thick, and preferably about .005" thick by about .020" wide.

The ladder tape illustrated in the drawings is of standard nominal dimensions, and the standard nominal longitudinal spacing or distance between each two successive ladders, and between corresponding parts of each two successive weave-ins, along each main tape is 1⅝ inches. While this ladder tape cannot be woven with such an actual substantially uniform spacing of the ladders, by starting with initial-stage ladder tape having suitably oversized ladder spacings, and subjecting this initial-stage ladder tape to a shrinking and setting operation, ladder tape, or what may be called final-stage ladder tape can be obtained having substantially uniform ladder spacings of 1⅝". The said suitably oversized ladder spacings are preferably 1²³⁄₃₂"±¹⁄₁₆", which equals a range of from 1²¹⁄₃₂" to 1²⁵⁄₃₂". Inasmuch as the nominal spacing of two successive longitudinally-aligned ladders of staggered-ladder ladder tape, is just double 1⅝", that is, 3¼", the correspondingly oversized ladder spacings are 3⁵⁄₁₆"±⅛", which equals a range of from 3³⁄₁₆" to 3⁷⁄₁₆".

Where such expressions as multiple-length ladder tape are used, they are intended to mean ladder tape of a length which is a plurality of times the length of a piece of ladder tape that is long enough for a Venetian-blind for the longest usual window.

Referring to Figs. 9 to 23 and 34, one form of continuous heat-setting apparatus or machine 49 (Figs. 9, 10, 34) adapted to heat set multiple-length ladder tape, includes a ladder tape supply means 50, ladder tape guiding and opening means 51, ladder tape endless conveyor and limit-setting means 52, endless conveyor adjustable electric drive unit 53, ladder tape take off means 54, a ladder tape heating section 55, a ladder tape cooling section 56, and a main frame 57 on which the parts 51 to 56 are mounted.

The ladder tape supply means 50 includes a supply reel 58 having a roll of ladder tape 40 to be heat-set, removably mounted on a support 59, and having a weighted friction strap 60 pressing against the roll of ladder tape to prevent it from unwinding too fast. The ladder tape 40 passes under the guide roller 61, and over the guide spool 62 mounted on a guide base plate 63 (Fig. 18), then under a leaf friction spring 64 secured in a channel-shaped support 65 hinged at 66 (Fig. 11) and normally held closed by a latch 67, so that the support 65 and spring 64 can be swung up out of the way to permit easy threading of the ladder tape 40 through beneath the spring 64. The ladder tape 40 then extends through a tape-opening guide 68 (Figs. 18, 19) having oppositely inwardly directed and longitudinally extending pairs of median flanges 69, each pair of which flanges extends close together along between the outer longitudinal edges of the main tapes 41, 42, of the ladder tape 40, until a flared portion 70 of the guide 68 is reached, where the portions 71 of the flanges 69 are correspondingly flared or spread apart (Fig. 18) to spread apart the opposite side edges of the main tapes 41, 42 of the ladder tape 40. Two upper suction nozzles 72, 73 and one lower suction nozzle 74 are provided with adequate air suction from a suitable suction machine 75 (Fig. 10), to slidably hold the opposite outer side edge-portions of the main tapes 41, 42 and hold them apart without any part of them being in the way of entrance of mechanical setting fingers which are to enter the space between the main tapes, as will later be described.

The tape-opening guide 68 has a support plate 68a (Figs. 11, 18) having elongated slots 68b through which screws 68c adjustably secure it to the guide base plate 63 to adjust the guide 68 rearwardly or forwardly to any precise desired position. And the base plate 63 has two pairs of screws 63a and 63b by which the rearward portion of the base plate 63 can be adjusted up or down to correspondingly adjust the guide 68 up or down.

The endless conveyor 52 includes two flexible base-means, preferably in the form of endless chains 76 and 77. Each endless chain is made with identical sets of finger-links 78, plain links 79, hinge or pivot pins 79a and rollers 80 (Figs. 15, 16, 17). Each chain finger-link 78 has fingers 78a and 78b adjacent its opposite ends. Each finger 78a has a point 78a1 and two V-shape edge-portions 78a2 and 78a3, and a blunt edge 78a4. And each finger 78b has a point 78b1 and two V-shape edge portions 78b2 and 78b3. The V-shape of the edges so described, facilitate the perfect entry of the fingers 78a and 78b properly between the main tapes 41, 42. The edges 78a4 and 78b2 form a slot 78c having cooperating holding edges when the links are in the positions shown in Fig. 15 to permit the cross-over floats 48 and 48a of the ladder tape 40 or 40a to just freely slide in and out of the slots 78c of the chain. The distance between centers of two successive longitudinally-aligned slots 78c of a chain for setting staggered-rung ladder tape, will be 3¼". The links are assembled in an obvious way to make the two endless chains 76, 77 respectively right and left hand (Fig. 11) and to respectively travel in the directions of the arrows 76a and 77a.

The adjustable electric drive unit 53 (Figs. 9, 10) through a chain and sprocket drive means 81, drives a speed reducer unit 82 which in turn drives the vertical shaft 83 on which is secured a spur gear 84 which in turn drives an identical spur gear 85 secured on the vertical shaft 86 to thus drive the shafts 83 and 86 at exactly the same speed but in the opposite directions indicated by the arrows 83a, 86a.

Also secured on the shaft 83, is a sprocket wheel 87, around which sprocket wheel 87 the chain 76 travels, with the forward-traveling portion 76b of the chain 76 traveling forward along the chain track 76c to the forward portion of the machine (Fig. 11) where it passes around the sprocket wheel 88 which is secured on the vertical shaft 89, and thence rearwardly along the track 76d to the sprocket wheel 87. Also secured on the shaft 89 is a spur gear 90 in mesh with an identical spur gear 91 secured on the shaft 92, on which shaft 92 is also secured a sprocket wheel 93 identical with the sprocket wheel 88, so that the sprocket wheel 88 and chain 76, travel at the same speed as the sprocket wheel 93 and chain 77, but in opposite directions.

As the chain 77 (Fig. 22) is rotated by the sprocket wheel 94, its forward traveling portion 77b travels along the track 77c to and around the forward sprocket wheel 93 (Fig. 11) and back along the track 77d to the rear sprocket wheel 94. The tracks 76c, 76d, 77c and 77d for the chains, are preferably made of hard maple wood for good wear-resistance.

As the extreme forward curved portions of the chains 76 and 77 (Fig. 11) rotate toward each other, each two adjacent fingers 78a and 78b temporarily forms a slot 78c of V-shape, which readily receives a group of cross-over floats 48, 48a of the ladder tape as the pairs of fingers 78a and 78b of the two chains slide in between the main tapes 41, 42 of the ladder tape, and the flared slots 78c gradually close to form the slots 78c parallel sided to properly hold the groups of floats 48, 48a as the rearwardly traveling portions of the chains 76 and 77 respectively travel along the tracks 76d and 77d and into and through the heating section 55 and cooling section 56.

Figure 22:
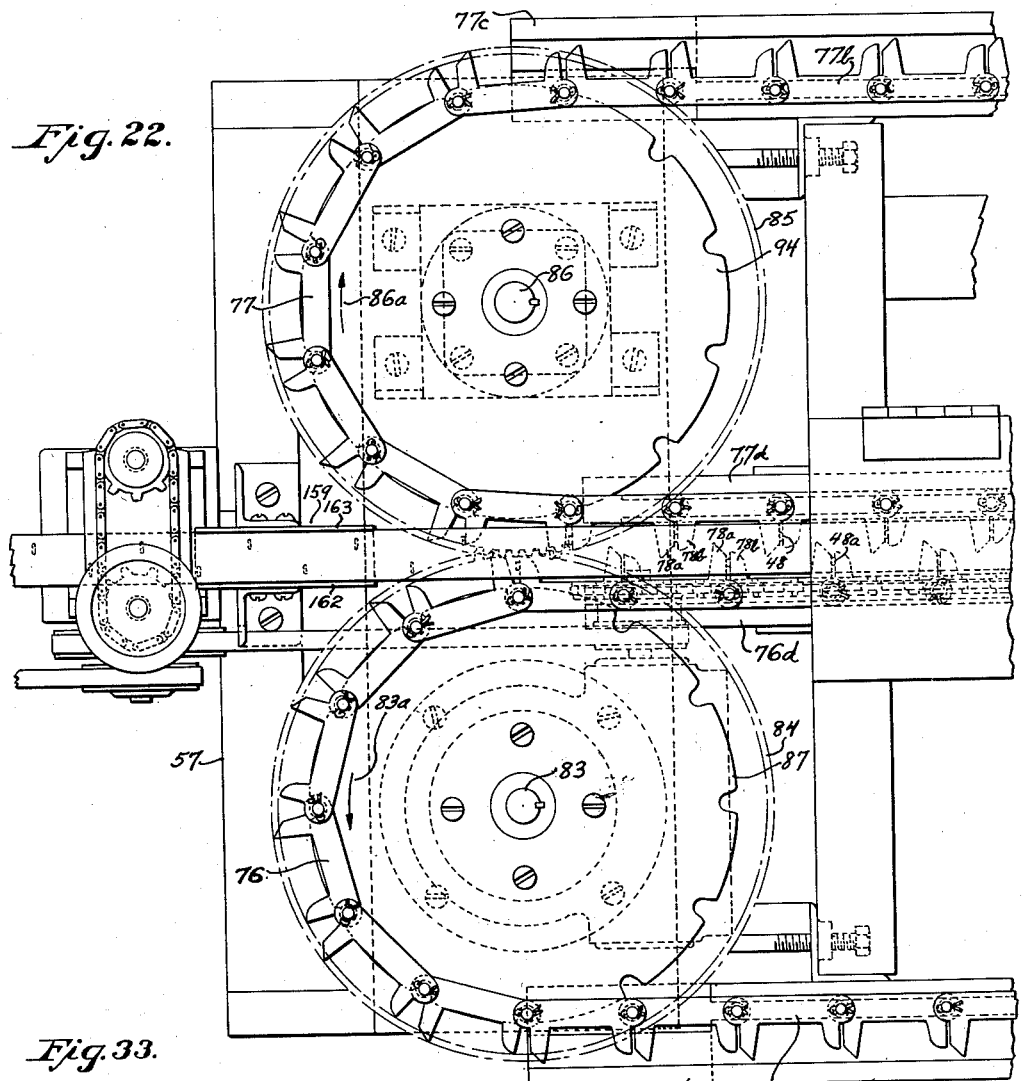
Fig. 22 (sheet 7) is an enlarged top plan view of the rear end portion of Fig. 10.

During this narrowing action of the slots 78c, the fingers 78a, 78b are entering between the flared edges of the main tapes (Figs. 18, 11), during which entering action, the points 78a1, 78b1, and double beveled edges 78a2, 78a3, 78b2, 78b3 aid in causing the easy and most perfect entry into the ladder tape 40 into proper holding relation with the groups of floats 48, 48a of the ladder tape. The opposed holding or limit-holding edges 78a4 and 78b2 preferably do not come close enough together to actually grip the float threads 48, 48a between them. The chains shown in Figs. 11, 15 and 22 are illustrated as being used for heat setting staggered-rung ladder tape 40 of Figs. 1 and 2, and therefore the distance between the center lines of each two successive slots 78c will be 3¼ inches, which is the desired distance between the center lines of each two successive aligned groups of floats 48, 48a and aligned ladders or rungs 43, 43a. And inasmuch as the distance between the center lines of successive aligned groups of floats 48, 48a as woven, is substantially greater than 3¼", that means that as each finger 78b swings to closed position and moves the successive floats 48, 48a to the desired shorter spacing, this results in crumpling (not shown) of the main tapes 41, 42.

Now as the ladder tape 40 moves onward with the double-chain conveyor into and through the inner housing 55a of the heating section 55, the combined heating action of the heated air therein and of the heating rays from the heater elements 104, 105, 108, 109, heats the main tapes 41, 42 and the saran monofilament main-tape warp strands 45 thereof, up to a temperature which causes the main-tape warp strands 45 to quickly shrink until the shrinkage between successive aligned floats and between successive aligned ladders and of other corresponding parts of staggered-rung ladder tape closer together than 3¼ inches is prevented by the limit-holding action of the rigid steel fingers of the chains.

As the chains enter and pass through the housing 143 of the cooling section 56, the air of ordinary room temperature which is being blown therethrough, cools the ladder tape 40 down to below any temperature that would tend to cause further shrinkage when it is removed from the chains.

To conserve heat, and minimize the effects of air drafts, the heating section 55 has a main outer enclosure 96 (Figs. 9, 10, 20), part of which comprises four large upper hinged doors 97, 98, 99, 100, large doors 97 and 98 each having a small inspection door 101.

In the heating section 55 is an inner longitudinally-extending housing 55a (Fig. 20), in which are two upper radiant heater units 102, 103 respectively having radiant heater elements 104, 105, and two lower radiant heater units 106, 107, respectively having radiant heater elements 108, 109. Also in the inner housing 55a of the heating section 55, are two upper and two lower thermo-electric or thermocouple elements 110, 111, 112, 113, each respectively connected by a pair of conductor wires to the pyrometer dials 114, 115, 116, 117.

The radiant heater element 104 is connected to the alternating current electric supply wires 118, 119 by wires 120 and 121, the wire 121 being connected to the wire 119 by connection through a magnetic switch 122 of a Cramer Percentage Timer 123 made by the R. W. Cramer Company, Inc., of Centerbrook, Conn. This percentage timer is a means for adjusting and controlling the temperature of the heating element 104. By turning the dial knob and pointer 124 to a desired adjusted position, the mechanism can be set to automatically turn the current on and off to the heater element 104 for any desired percentages of each successive thirty-second period. In the same way, the other heater elements 105, 108 and 109 can be controlled respectively by the percentage timers 125, 126 and 127. Each of the radiant heater units 102, 103, 106 and 107 is a Chromlox Radiant Heater unit of 3600 watts rating, made by Edwin L. Wiegand Co., Pittsburgh, Pa.

In order that the travel of the ladder tape 40 through the inner housing 55a of the heating section 55 may be safely stopped without having to shut off the electric power to the radiant heater units 102, 103, 106, 107, in order not to overheat the ladder tape 40 so stopped, a shaft 128 (Figs. 9, 20) extends throughout the length of the heating section 55 and has secured thereto, in the front portion of the heating section 55, three upwardly extending arms 129 carrying a pair of baffle or shield plates 130, 131, and said shaft 128 also has secured thereto, in the rear portion of the heating section 55, three upwardly extending arms 132 carrying a pair of baffle or shield plates 133, 134, so that when the shaft 128 is rocked clockwise to swing the arms 129 and 132 to bring the shield plates 130, 131, 133 and 134 respectively between the ladder tape 40 and the heater elements 105, 109, 104 and 108, the ladder tape 40 will be protected from overheating by the heater elements.

Secured to the shaft 128, are two arms 135, 136, each carrying a plurality of removable counterweight elements 137 of sufficient total weight to hold the latch arm 138 down against the top of the latch 139 which is normally spring pressed out to the latching position shown in Fig. 20 by a spring 140, so that when the solenoid 141 is energized by electric current (Figs. 34, 20), the latch 139 is pulled back against the action of the spring 140 and out of the path of the latch arm 138 to permit the shaft 128 and the parts carried by it, to be rocked or rotated clockwise by the weights 137 until the arms 129, 132 engage against the inner housing casing 55a. A handle 142 is secured to the shaft 128 to permit a person to swing or rock the shaft 128 and the parts carried by it, back to the original full-line latched position shown in Fig. 20, as will be more fully hereinafter described in connection with the description of Fig. 34.

Before ladder tape can be heat-set by the apparatus illustrated, the inner housing 55a of the heating section 55 must first be brought up to suitable operating temperature. The sole source of heat used, is electrical heat supplied by the four radiant heater elements 104, 105, 108 and 109. After the electric power has been turned on to the said four heater elements and has been on for half an hour or so, the pyrometer dails 114, 115, 116 and 117, should read about 250° F. The machine operator keeps occasional watch of the pyrometer dials during the heat-up period, and if any of them have readings substantially below the others, he adjusts such of the percentage timers 123, 125, 126, 127 as control the heating of the heater elements located near such of the thermocouples 110, 111, 112 and 113 whose pyrometer dials indicate low-temperature readings, to a higher percentage of time that the heating current is on. In due course, the four thermocouples should all reach about the same temperature of 250° F., which is high enough to start heat-setting operations. But as the ladder tape can only be successfully heat-set when fed through the machine at this low temperature of 250° F., by feeding it at the relatively slow speed of about 38 feet per minute, a higher operating temperature of 290° F. to 300° F., and a correspondingly high speed-of-feed of about 46 feet per minute, is preferable. When the temperature rises from cold to 250° F., operations can be started by rotatably adjusting the adjuster-handle 53a of the electric drive motor 53 for the speed of travel of 38 feet per minute indicated on the dial 53b. As the temperature rises higher and higher above 250° F., the adjuster handle 53a is adjusted to increase the speed of feed, until after a couple hours or so a temperature of 290° F. to 300° F. is reached, when the handle 53a is adjusted to increase the speed of feed to about 46 feet per minute.

The cooling section 56 has a long housing 143 with a plurality of top doors 144, and has the track portions 76d, 77d on which the rearward traveling portions of the chains 76, 77 travel and carry the ladder tape 40 rearwardly from the preceding heating section 55. Blower-pipes 145, 146 enter opposite sides, (Figs. 9, 10, 21), and blower pipes 147, 148 enter the bottom of the housing 143 from a main blower pipe 149 which receives air blown into the pipe 149 by a rotary blower 150 which sucks air down into the inlet pipe 151, for the primary purpose of cooling the ladder tape 40 or 40a as it travels rearwardly through the housing 143. Adjustable dampers 145a, 146a, 147a, and 148a are respectively mounted in the pipes 145, 146, 147 and 148 for adjusting the air flow through these pipes, depending upon the temperature in the room.

The overall length of an actual machine made as illustrated in Fig. 1, is over 44 feet, and in order to start, and to stop it, and to operate the shields into and out of protective relation to the ladder tape being heat-shrunk and set, depending on whether the ladder tape is traveling or is standing still at a given time, certain switching and related mechanism (Fig. 34) is employed. Normally, when the drive motor 53 and the endless chains 76 and 77 are not running, the shields 130, 131, 133, 134 are in the broken-line shielding positions (Fig. 20), regardless of whether or not any ladder tape were in the machine and between the radiant heater elements while the chains and ladder tape were not traveling, and if the shields were not in protective or shielding position, a length of many feet of ladder tape would be quickly destroyed by excessive heat.

A starting switch 152 normally held open by a spring 152a, (Fig. 34) will be located at the front of the machine (not shown) adjacent the handle 142 which is connected to the shield-mechanism shaft 128, and several shut-off switches 153 normally held closed by springs 153a, will ordinarily be located at various parts of the machine, such as the front end of the machine adjacent the starting switch, also at about the middle of the machine, and also at the rear or take-off end of the machine.

Now assuming the parts to be in the full line positions shown in Fig. 34, the starting switch 152 is pressed down against the action of the spring 152a, which closes the circuit through the solenoid coil 154, which pulls the solenoid-core switch-bar 154a to the left to close the three switches 155, 156 and 157, and to open the switch 158. The closing of the switch 155 keeps the circuit closed through the solenoid coil 154 notwithstanding that the spring 152a immediately pushed the switch 152 open as soon as it was released by the person who pressed it closed against the spring 152a. Therefore the switches 156 and 157 remain closed with the result that the drive motor 53 has started to drive the endless chains 76, 77 and the take-off mechanism 54. Also, the switch 158 remains open, with the result that the spring 140 is permitted to push the latch 139 on the solenoid core 141a out to latching position (Fig. 20). Now the operator swings the lever 142 counterclockwise, to the full-line position of the parts shown in Fig. 20 to cause the shields 130, 131, 133, 134 to move out of shielding position so that the radiant heat rays from the heater elements 104, 105, 108 and 109 impinge upon the upper and lower faces of the traveling ladder tape 40.

If now it is desired to stop the operation of the machine, it is only necessary to temporarily press down any one of the switches 153 against the action of its spring 153a, which breaks the circuit through the solenoid coil 154, with the result that the spring 154b pulls the solenoid core switch bar 154a to the right to open the switches 155, 156 and 157, to shut off the motor 53, and to close the switch 158 to cause the solenoid coil 141 to pull the solenoid core 141a and latch 139 back against the action of the spring 140 to release the latch bar or arm 138 (Fig. 20) and thus permit the weight members 137 to swing the shaft 128 and its attached parts clockwise, to swing the shields 130, 131, 133, 134 into the broken-line shielding positions between the ladder tape and the radiant heating elements.

Having heretofore explained in detail, the mode of operation of the more complicated mechanisms of the machine, the overall operation of the machine will not be given. Assuming that the inner housing 55a of the heating section 55 is now at a proper operating temperature, that the drive motor 53 has been started to drive the endless chains 76, 77 at proper speed, and is driving the take-off mechanism 54, and that the air blower 150 has been started to blow air through the housing 143 of the cooling section 56, and that the ladder tape 40 has been threaded into the front end of the machine to a location several inches to the left of line 12—12 of Fig. 11, as the sprocket wheels 88, 93 rotate in the opposite directions of the arrows 76a, 77a, the extreme forward curved portions of the chains 76, 77 move toward one another with each pair of fingers 78a and 78b spread apart to have the slot 78c temporarily of V-shape. As links of the chains 76, 77 approach more and more closely to parallelism to one another, the slots 78c become narrower and narrower, until finally the slots become straight (Figs. 11, 15), whereupon the fingers 78a and 78b properly limit hold the floats 48, 48a for heat-setting the tape, as hereinbefore explained in detail.

As the rearward-traveling portions of the endless chains 76, 77 with the ladder tape portions being successively mounted thereon as the tape unwinds from the supply reel 58, travel through the inner housing 55a of the heating section 55, the ladder tape is shrunk by the heat, and the amount of shrinkage is controlled and made uniform by the limit-holding action of the chain fingers 78a, 78b, as hereinbefore fully explained.

Then the rearward-traveling portions of the chains with the ladder tape mounted thereon, pass through the cooling section 56 where the ladder tape is properly cooled as previously fully explained.

In order to remove the heat-shrunk and set ladder tape 40 from the conveyor chains 76, 77, take-off means 54 is provided. First, by having the axes of the rear vertical shafts 83, 86 (Fig. 22) spaced apart about 3/16" more than the front vertical shafts 89, 92 are spaced apart, so that as the two rearward traveling portions of the chains approach the sprocket wheels 87, 94, the fingers 78a and 78b of the respective two chains, are pulled oppositely outward a short distance from their tight engagement with the floats 48a, 48 of the ladder tape 40. Then the ladder tape 40 is pulled lengthwise through a guide-trough 159 by take-off rolls 160, 161. The guide-trough 159 has side guides 162, 163 spaced apart a little more than the width of the ladder tape, and adapted to engage either side edge of the ladder tape if the ladder tape is pulled sidewise by the teeth of one or the other of the chains so as to prevent such sidewise, edgewise movements of the ladder tape. The take-off roll 160 has a cylindrical stainless steel surface portion, and the roll 161 has a same-size cylindrical surface portion of considerable thickness, preferably of rubber, neoprene, Hycar or other elastomer material not unduly affected by plasticizer coming out of the saran main tape warp strands.

The take-off roll 160 is driven by gears 164 by a pulley 165 on shaft 166, said pulley 165 being driven by a belt 167 from the speed reducer 82. The take-off roll 161 is driven by its friction with the ladder tape. A belt 168 driven by a pulley 169, drives a reel-up reel 170 on which the heat-set ladder tape is wound up.

Fig. 24 illustrates how the hereinbefore disclosed form of the invention works with twin-rung ladder tape 40a (see Fig. 3). The operation is the same as hereinbefore explained, except that the chain fingers only hold every other group of floats 48, 48a along each edge of the ladder tape. After the heat setting operation, the unheld intermediate groups of warp floats along each edge, are properly spaced from the held floats at each side of the unheld floats.

The modified form of the invention illustrated in Fig. 25 is especially adapted for setting twin-rung ladder tape by holding all of the floats 48, 48a of the twin-rung ladder tape 40a. As twin-rung ladder tape has twice as many groups of floats as staggered-rung ladder tape has, this means that the set-distance between each two successive groups of floats along each edge of the twin-rung ladder tape is one-half the distance between each two succesive groups of floats along each edge of staggered ladder tape, and therefore in order to hold all the floats of twin-rung ladder tape, each link 171 of each of chains 172, 173, is half as long between its pivot centers 174 in order to have the distance between the centers of the slots 175 one half the distance between the centers of the slots of the links of previously described chains 76, 77. Accordingly, the sprocket wheels 176, 177 have the centers of their pivot sockets 178 half as far apart as in the case of the sprocket wheels 87, 88, 93, 94. Each link 171 has its fingers 179, 180 substantially the same as the fingers 78a, 78b of the chains 76, 77, except that the length of finger 179 is shorter than the corresponding finger 78a in order that the ends of the opposite fingers 179 of the chains 172 and 173 shall not engage against one another.

In the modified form of the invention illustrated in Figs. 26, 27 and 28, instead of setting ladder tape by holding the floats, the floats have been cut and the ladder tape has been opened up as illustrated in Fig. 4, and this opened-up tape is shrunk and set in this condition by holding both end portions of the ladders 43, 43a adjacent their connections with the main tapes 41, 42. Instead of having suction tube nozzles 72, 73 and 74, spaced-apart upper and lower suction boxes 181, 182 are employed, each having a grating 183 with longitudinal grating bars 184. Each chain 185, 186 is formed with essentially identical upper and lower finger links 187 separated by rollers 188 which engage in pivot sockets 189 of the sprocket wheels 190, 191. By having the ends or points 192, 193 of the fingers 194, 195 of the upper links bent downwardly, and the points 192, 193 of the lower links 194, 195 bent upwardly (Fig. 28), it is not necessary to bevel the points or edges of the fingers.

Figure 30:
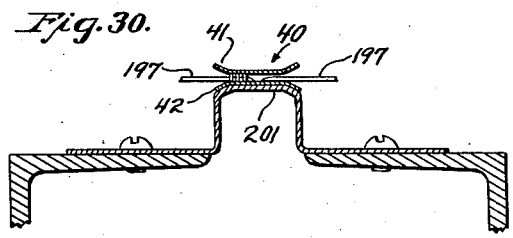
Fig. 30 is an enlarged fragmental view similar to Fig. 12, of a modified construction employing the modified chain holding and setting finger construction of Fig. 29.
Figure 29:
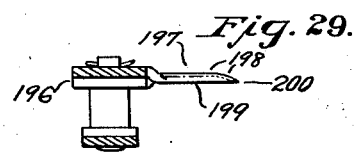
Fig. 29 (sheet 6) is a view similar to Fig. 17, of a modified form of chain holding and setting fingers.

Instead of having the chain fingers beveled from both faces toward edges at the middle of the fingers as in Figs. 15 to 17, in the form of the invention illustrated in Figs. 29 and 30, each chain link 196 has each finger 197 beveled only in one direction as at 198 toward the other face 199 which is flat, out to the point or edge 200. By having a suitable support 201 whose upper face is straight longitudinally and shaped transversely as shown, to have the lower main tape 42 of the ladder tape 40 or 40a slide therealong, as fingers of the shape shown are caused to move into the ladder tape between the main tapes 41, 42, the fingers pick up and ride under ladder warp strands with minimum risk of the ends of the fingers jamming against ladder warp strands and damaging the ladder tape.

Figure 32:
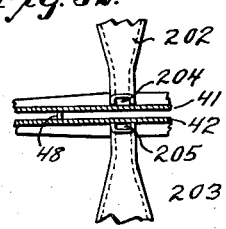
Fig. 32 is a sectional view on line 32—32 of Fig. 31.
Figure 31:
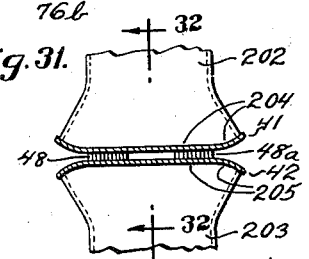
Fig. 31 (sheet 7) is a fragmental view similar to Fig. 12, of a modified form of suction-tube ends.

In the form of the invention illustrated in Figs. 31 and 32, the suction nozzles 202, 203 are to take the place respectively of the suction nozzles 72 and 74. By having the open ends 204, 205 of the respective suction nozzles 202, 203 shaped as shown, to conform to the shape of the main tapes 41, 42 directly above and below the floats 48, 48a and having the edges of the main tapes spread apart as in Fig. 18, instead of having the suction-nozzle ends straight as in the suction nozzles 72, 74 (Figs. 12, 18), there is less risk of the ladder tape portions in the region of the floats drifting up or down due to variation in suction of the upper and lower suction nozzles, and consequently less risk of failure of the suction nozzles holding the ladder tape in proper position at all times for proper entry of the chain fingers between the main tapes. In view of this, it is unnecessary to employ a third suction nozzle such as 73.

Figure 33:
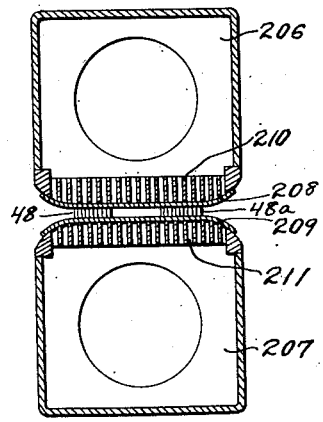
Fig. 33 is a fragmental view similar to Fig. 28, of a modified form of suction means.

In the form of the invention illustrated in Fig. 33, the suction boxes 206 and 207 are generally similar to the suction boxes 181, 182 of Figs. 26 to 28, but have the faces 208, 209 of the gratings 210, 211 of oppositely-flared shape similar to the nozzles 202, 203 of Figs. 31 and 32, and placed the same distance apart as the ends of the nozzles 202, 203 of Fig. 31 for use in place of nozzles 202, 203, if so desired. Also, the suction boxes 206, 207 can be used in place of the suction boxes 181, 182 of Figs. 26 to 28 if so desired.

While radiant heat is a preferred way of heating the ladder tape for the heat shrinking and setting operation, other heating means such as steam and other heated fluids such as hot air and hot water can be employed instead. The heating and setting operation can be carried out by having the main tape warp strands at the temperature of boiling water, or even lower, the lower the temperature, the longer the time the heating and setting operation requires.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

We claim:

1. The method of making multiple-length final-stage woven ladder tape having two woven main tapes with ladders interconnecting the main tapes by ladder-warp strands woven to the main tapes at spaced-apart weave-ins along each main tape, and with corresponding parts of each two successive weave-ins along each main tape spaced apart a substantially constant predetermined longitudinal distance, comprising: providing multiple-length initial-stage woven ladder tape having two woven main tapes with ladders interconnecting the main tapes by ladder-warp strands woven to the main tapes at spaced-apart weave-ins along each main tape, each main tape having a weft strand woven with main-tape warp strands, which main-tape warp strands and main tapes and ladder tape are substantially shrinkable longitudinally when the main-tape warp strands are subjected to shrinking treatment, the longitudinal distances between corresponding parts of at least some successive weave-ins along each main tape of said initial-stage ladder tape, varying substantially from one another but not being substantially less than said predetermined distance; causing said initial-stage ladder tape to travel longitudinally; limit-holding spaced-apart parts of said ladder tape with holding means constructed and arranged to permit said main tapes, when said main-tape warp strands are subjected to shrinking treatment, to shrink to cause the longitudinal distance between corresponding parts of each two successive weave-ins along each main tape to be substantially equal to but not substantially less than the said predetermined distance; and subjecting said main-tape warp strands of said ladder tape while so held, to said shrinking treatment to produce said final-stage ladder tape.

2. The method of making multiple-length final-stage woven ladder tape having two woven main tapes with ladders interconnecting the main tapes by ladder-warp strands woven to the main tapes at spaced-apart weave-ins along each main tape, and with corresponding parts of each two successive weave-ins along each main tape spaced apart a substantially constant predetermined longitudinal distance, comprising: providing multiple-length initial-stage woven ladder tape having two woven main tapes with ladders interconnecting the main tapes by ladder-warp strands woven to the main tapes at spaced-apart weave-ins along each main tape and as cross-over floats at said weave-ins, each main tape having a weft strand woven with main-tape warp strands, which main-tape warp strands and main tapes and ladder tape are substantially shrinkable longitudinally when the main-tape warp strands are subjected to shrinking treatment, the longitudinal distances between corresponding parts of at least some successive weave-ins along each main tape of said initial-stage ladder tape, varying substantially from one another but not being substantially less than said predetermined distance; causing said initial-stage ladder tape to travel longitudinally; limit-holding spaced-apart cross-over floats of said traveling ladder tape with holding means constructed and arranged to permit said main tapes, when said main-tape warp strands are subjected to shrinking treatment, to shrink to cause the longitudinal distance between corresponding parts of each two successive weave-ins along each main tape to be substantially equal to but not substantially less than the said predetermined distance; and subjecting said main-tape warp strands of said traveling ladder tape while so held, to said shrinking treatment to produce said final-stage ladder tape.

3. The method of making multiple-length final-stage woven ladder tape having two woven main tapes with ladders interconnecting the main tapes by ladder-warp strands woven to the main tapes at spaced-apart weave-ins along each main tape, and with corresponding parts of each two successive weave-ins along each main tape spaced apart a substantially constant predetermined longitudinal distance, comprising: providing multiple-length initial-stage woven ladder tape having two woven main tapes with ladders interconnecting the main tapes by ladder-warp strands woven to the main tapes at spaced-apart weave-ins along each main tape, each main tape having a weft strand woven with main-tape warp strands, which main-tape warp strands and main tapes and ladder tape are substantially shrinkable longitudinally when the main-tape warp strands are subjected to heat-shrinking treatment, the longitudinal distances between corresponding parts of at least some successive weave-ins along each main tape of said initial-stage ladder tape, varying substantially from one another but not being substantially less than said predetermined distance; causing said initial-stage ladder tape to travel longitudinally; limit-holding spaced-apart parts of said traveling ladder tape with holding means constructed and arranged to permit said main tapes, when said main-tape warp strands are subjected to heat-shrinking treatment, to shrink to cause the longitudinal distance between corresponding parts of each two successive weave-ins along each main tape to be substantially equal to but not substantially less than the said predetermined distance; and subjecting said main-tape warp strands of said traveling ladder tape while so held, to said heat-shrinking treatment to produce said final-stage ladder tape.

4. The method of making multiple-length final-stage woven ladder tape having two woven main tapes with ladders interconnecting the main tapes by ladder-warp strands woven to the main tapes at spaced-apart weave-ins along each main tape, and with corresponding parts of each two successive weave-ins along each main tape spaced apart a substantially constant predetermined longitudinal distance, comprising: providing multiple-length initial-stage woven ladder tape having two woven main tapes with ladders interconnecting the main tapes by ladder-warp strands woven to the main tapes at spaced-apart weave-ins along each main tape and as cross-over floats at said weave-ins, each main tape having a weft strand woven with main-tape warp strands, which main-tape warp strands and main tapes and ladder tape are substantially shrinkable longitudinally when the main-tape warp strands are subjected to heat-shrinking treatment, the longitudinal distances between corresponding parts of at least some successive weave-ins along each main tape of said initial-stage ladder tape, varying substantially from one another but not being substantially less than said predetermined distance; causing said initial-stage ladder tape to travel longitudinally; limit-holding spaced-apart cross-over floats of said traveling ladder tape with holding means constructed and arranged to permit said main tapes, when said main-tape warp strands are subjected to heat-shrinking treatment, to shrink to cause the longitudinal distance between corresponding parts of each two successive weave-ins along each main tape to be substantially equal to but not substantially less than the said predetermined distance; and subjecting said main-tape warp strands of said traveling ladder tape while so held, to said heat-shrinking treatment to produce said final-stage ladder tape.

5. The method of making multiple-length final-stage woven ladder tape having two woven main tapes with ladders interconnecting the main tapes by ladder-warp strands woven to the main tapes at spaced-apart weave-ins along each main tape, and with corresponding parts of each two successive weave-ins along each main tape spaced apart a substantially constant predetermined longitudinal distance, comprising: providing multiple-length initial-stage woven ladder tape having two woven main tapes with ladders interconnecting the main tapes by ladder-warp strands woven to the main tapes at spaced-apart weave-ins along each main tape, each main tape having a weft strand woven with monofilament saran main-tape warp strands, which main-tape warp strands and main tapes and ladder tape are substantially shrinkable longitudinally when the main-tape warp strands are subjected to heat-shrinking treatment, the longitudinal distances between corresponding parts of at least some successive weave-ins along each main tape of said initial-stage ladder tape, varying substantially from one another but not being substantially less than said predetermined distance; causing said initial-stage ladder tape to travel longitudinally; limit-holding spaced-apart parts of said traveling ladder tape with holding means constructed and arranged to permit said main tapes, when said main-tape warp strands are subjected to heat-shrinking treatment, to shrink to cause the longitudinal distance between corresponding parts of each two successive weave-ins along each main tape to be substantially equal to but not substantially less than the said predetermined distance; and subjecting said main-tape warp strands of said traveling ladder tape while so held, to said heat-shrinking treatment to produce said final-stage ladder tape.

6. The method of making multiple-length final-stage woven ladder tape having two woven main tapes with ladders interconnecting the main tapes by ladder-warp strands woven to the main tapes at spaced-apart weave-ins along each main tape, and with corresponding parts of each two successive weave-ins along each main tape spaced apart a substantially constant predetermined longitudinal distance, comprising: providing multiple-length initial-stage woven ladder tape having two woven main tapes with ladders interconnecting the main tapes by ladder-warp strands woven to the main tapes at spaced-apart weave-ins along each main tape and as cross-over floats at said weave-ins, each main tape having a weft strand woven with monofilament saran main-tape warp strands, which main-tape warp strands and main tapes and ladder tape are substantially shrinkable longitudinally when the main-tape warp strands are subjected to heat-shrinking treatment, the longitudinal distances between corresponding parts of at least some successive weave-ins along each main tape of said initial-stage ladder tape, varying substantially from one another but not being substantially less than said predetermined distance; causing said initial-stage ladder tape to travel longitudinally; limit-holding spaced-apart cross-over floats of said traveling ladder tape with holding means constructed and arranged to permit said main tapes, when said main-tape warp strands are subjected to heat-shrinking treatment, to shrink to cause the longitudinal distance between corresponding parts of each two successive weave-ins along each main tape to be substantially equal to but not substantially less than the said predetermined distance; and subjecting said main-tape warp strands of said traveling ladder tape while so held, to said heat-shrinking treatment to produce said final-stage ladder tape.

7. Apparatus adapted to be used for making multiple-length final-stage woven ladder tapes including warp strands with ladders interconnecting the main tapes by ladder-warp strands woven to the main tapes at spaced-apart weave-ins along each main tape, comprising: limit-setting means having base-means with spaced-apart limit-holding means mounted on the base-means; said limit-setting means being constructed and arranged to travel longitudinally and to engage and limit-hold spaced-apart parts of the initial-stage ladder tape and move it longitudinally, and permit the main tapes of the initial-stage ladder tape when the main-tape warp strands are subjected to shrinking treatment, to shrink to cause the longitudinal distance between corresponding parts of each two successive weave-ins along each main tape to be substantially equal to but not substantially less than said predetermined distance.

8. Apparatus adapted to be used for making multiple-length final-stage woven ladder tapes including warp strands with ladders interconnecting the main tapes by ladder-warp strands woven to the main tapes at spaced-apart weave-ins along each main tape, comprising: limit-setting means having flexible, endless base-means with spaced-apart limit-holding means mounted on the base-means; said limit-setting means being constructed and arranged to travel longitudinally and to engage and limit-hold spaced-apart parts of the initial-stage ladder tape and move it longitudinally, and permit the main tapes of the initial-stage ladder tape when the main-tape warp strands are subjected to shrinking treatment, to shrink to cause the longitudinal distance between corresponding parts of each two successive weave-ins along each main tape to be substantially equal to but not substantially less than said predetermined distance.

9. Apparatus adapted to be used for making multiple-length final-stage woven ladder tapes including warp strands with ladders interconnecting the main tapes by ladder-warp strands woven to the main tapes at spaced-apart weave-ins along each main tape, comprising: limit-setting means having flexible, endless base-means with spaced-apart limit-holding means mounted on the base-means; said limit-setting means being constructed and arranged to travel longitudinally and to engage and limit-hold spaced-apart cross-over floats of the initial-stage ladder tape and move it longitudinally, and permit the main tapes of the initial-stage ladder tape when the main-tape warp strands are subjected to shrinking treatment, to shrink to cause the longitudinal distance between corresponding parts of each two successive weave-ins along each main tape to be substantially equal to but not substantially less than said predetermined distance.

10. Apparatus adapted to be used for making multiple-length final-stage woven ladder tapes including warp strands with ladders interconnecting the main tapes by ladder-warp strands woven to the main tapes at spaced-apart weave-ins along each main tape, comprising: heating means; limit-setting means having flexible, endless base-means with spaced-apart limit-holding means mounted on the base-means; said limit-setting means being constructed and arranged to travel longitudinally adjacent said heating means and to engage and limit-hold spaced-apart parts of the initial-stage ladder tape and move it longitudinally, and permit the main tapes of the initial-stage ladder tape when the main-tape warp strands are subjected to shrinking treatment, to shrink to cause the longitudinal distance between corresponding parts of each two successive weave-ins along each main tape to be substantially equal to but not substantially less than said predetermined distance.

11. Apparatus adapted to be used for making multiple-length final-stage woven ladder tapes including warp strands with ladders interconnecting the main tapes by ladder-warp strands woven to the main tapes at spaced-apart weave-ins along each main tape, comprising: heating means; two limit-setting means each having flexible, endless base-means with spaced-apart limit-holding means mounted on the base-means; said limit-setting means being constructed and arranged to travel longitudinally and to engage and limit-hold spaced-apart parts of the initial-stage ladder tape and move it longitudinally, and permit the main tapes of the initial-stage ladder tape when the main-tape warp strands are subjected to shrinking treatment, to shrink to cause the longitudinal distance between corresponding parts of each two successive weave-ins along each main tape to be substantially equal to but not substantially less than said predetermined distance.

References Cited in the file of this patent

UNITED STATES PATENTS

| | | |
|---|---|---|
| 1,038,104 | Falter | Sept. 10, 1912 |
| 2,583,630 | Chatfield | Jan. 29, 1952 |
| 2,607,104 | Foster | Aug. 19, 1952 |
| 2,613,694 | French | Oct. 14, 1952 |